(12) United States Patent
Meen et al.

(10) Patent No.: US 10,775,846 B2
(45) Date of Patent: Sep. 15, 2020

(54) ELECTRONIC DEVICE FOR PROVIDING INFORMATION RELATED TO SMART WATCH AND METHOD FOR OPERATING THE SAME

(71) Applicant: Samsung Electronics Co., Ltd., Gyeonggi-do (KR)

(72) Inventors: Young-Jae Meen, Seoul (KR); Hyeon-Ju Lee, Seoul (KR); Sang-Hyun Park, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 190 days.

(21) Appl. No.: 15/991,041

(22) Filed: May 29, 2018

(65) Prior Publication Data

US 2018/0348814 A1    Dec. 6, 2018

(30) Foreign Application Priority Data

Jun. 1, 2017 (KR) .................... 10-2017-0068505

(51) Int. Cl.

| | |
|---|---|
| *G06F 1/16* | (2006.01) |
| *G06F 3/14* | (2006.01) |
| *G04G 17/08* | (2006.01) |
| *G06T 7/00* | (2017.01) |
| *G04G 21/02* | (2010.01) |
| *G06F 3/147* | (2006.01) |
| *G06T 7/73* | (2017.01) |

(Continued)

(52) U.S. Cl.
CPC .............. *G06F 1/163* (2013.01); *G04C 3/14* (2013.01); *G04G 17/08* (2013.01); *G04G 21/02* (2013.01); *G04G 21/025* (2013.01); *G04G 21/08* (2013.01); *G06F 3/147* (2013.01); *G06F 3/1454* (2013.01); *G06T 7/001* (2013.01); *G06T 7/74* (2017.01); *G06T 2207/10024* (2013.01); *G09G 2340/145* (2013.01); *G09G 2370/16* (2013.01)

(58) Field of Classification Search
CPC .... G06F 1/16; G06F 3/14; G06T 7/00; G04G 17/08
See application file for complete search history.

(56) References Cited

U.S. PATENT DOCUMENTS

| | | | | |
|---|---|---|---|---|
| 9,851,753 | B2* | 12/2017 | Gao | ................... G06F 1/163 |
| 2015/0160622 | A1* | 6/2015 | Kim | ................... G04G 21/02 |
| | | | | 368/9 |

(Continued)

OTHER PUBLICATIONS

Dr. V.V.Krishan, Suneel Kumar B, Verra Prasad V, "Classificaton of Metals Using Texture Features", IJCST vol. 4, Issue Spl-4, Oct. 2013, 3 pages(60-62),www.ijcst.com.

*Primary Examiner* — Mia M Thomas
(74) *Attorney, Agent, or Firm* — Cha & Reiter, LLC

(57) ABSTRACT

A electronic device according to various example embodiments may include: a display, a memory storing identification information of a plurality of electronic devices, and a processor, configured to: obtain an image including a watch face, select a first electronic device matching the watch face among the plurality of electronic devices by comparing one or more characteristics of the watch face in the obtained image to the plurality of electronic devices, and display, on the display, an image including the watch face and the selected first electronic device.

19 Claims, 14 Drawing Sheets

(51) Int. Cl.
G04C 3/14 (2006.01)
G04G 21/08 (2010.01)

(56) References Cited

U.S. PATENT DOCUMENTS

| | | | |
|---|---|---|---|
| 2015/0348495 A1* | 12/2015 | Kim | G06F 3/0484 345/156 |
| 2016/0098550 A1* | 4/2016 | Lam | G06F 21/32 726/18 |
| 2016/0127624 A1* | 5/2016 | Woo | G02B 27/017 348/36 |
| 2016/0192526 A1* | 6/2016 | Gao | G06F 1/163 361/679.01 |
| 2016/0284052 A1 | 9/2016 | Chang | |
| 2017/0221410 A1* | 8/2017 | Akimoto | G09G 3/2096 |
| 2018/0234622 A1* | 8/2018 | Bostick | H04N 5/23206 |
| 2018/0234623 A1* | 8/2018 | Bostick | H04N 5/23219 |
| 2018/0275715 A1* | 9/2018 | Park | G06F 1/16 |
| 2019/0080448 A1* | 3/2019 | Dewitt | G06K 9/32 |
| 2019/0180864 A1* | 6/2019 | Reicher | G16H 10/20 |
| 2019/0279520 A1* | 9/2019 | Wilson | A61B 5/1123 |
| 2019/0295478 A1* | 9/2019 | Hirakata | G09G 3/3406 |
| 2019/0333217 A1* | 10/2019 | Bronkalla | G06T 7/0014 |

\* cited by examiner

ELECTRONIC DEVICE FOR PROVIDING INFORMATION RELATED TO SMART WATCH AND METHOD FOR OPERATING THE SAME

CROSS-REFERENCE TO RELATED APPLICATION(S)

This application is based on and claims priority under 35 U.S.C. § 119 to Korean Patent Application No. 10-2017-0068505, filed on Jun. 1, 2017, in the Korean Intellectual Property Office, the disclosure of which is incorporated by reference herein in its entirety.

BACKGROUND

1. Field

Various example embodiments relate to an electronic device for providing information on a smart watch matching a watch face, and a method for operating the same.

2. Description of the Related Art

Recently, the development of smart watches has been actively conducted. Accordingly, various types of smart watches are being developed and released. Further, the development of watch faces, which are wallpapers for smart watches, is actively being conducted.

A watch face, which is a wallpaper for a smart watch, plays a significant role when functioning as an actual watch rather than a simple electronic device. Accordingly, watch faces with distinctive characteristics and various functions are designed.

To identify a smart watch matching a watch face among various smart watches, there is no option but to actually match the watch face with the smart watch. However, matching a watch face with each of various smart watches to select a smart watch matching a watch face is very difficult and inconvenient. That is, there is restriction in providing a smart watch matching a watch face to a user.

An electronic device according to various example embodiments may analyze a watch face and may provide information on a smart watch matching the watch face and a component of the smart watch.

A electronic device according to various example embodiments may include: a display, a memory storing identification information of a plurality of electronic devices, and a processor, configured to: obtain an image including a watch face, select a first electronic device matching the watch face among the plurality of electronic devices by comparing one or more characteristics of the watch face in the obtained image to the plurality of electronic devices, and display, on the display, an image including the watch face and the selected first electronic device.

An operation method of an electronic device according to various example embodiments may include: obtaining an image including a watch face, selecting a first electronic device matching the watch face among a plurality of electronic devices stored in the electronic device by comparing one or more characteristics of the watch face in the obtained image to the plurality of electronic devices, and displaying, on a display of the electronic device, an image including the watch face and the selected first electronic device.

A non-transitory computer-readable recording media storing programming instructions which are executable by a processor to cause the processor to: obtain an image including a watch face, select a first electronic device matching the watch face among a plurality of electronic devices stored in the electronic device by comparing one or more characteristics of the watch face in the obtained image to the plurality of electronic devices; and display, on a display, an image including the watch face and the selected first electronic device.

An electronic device according to various example embodiments may analyze a watch face and may provide information on a smart watch matching the watch face and a component of the smart watch, thereby identifying a smart watch matching a watch face.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
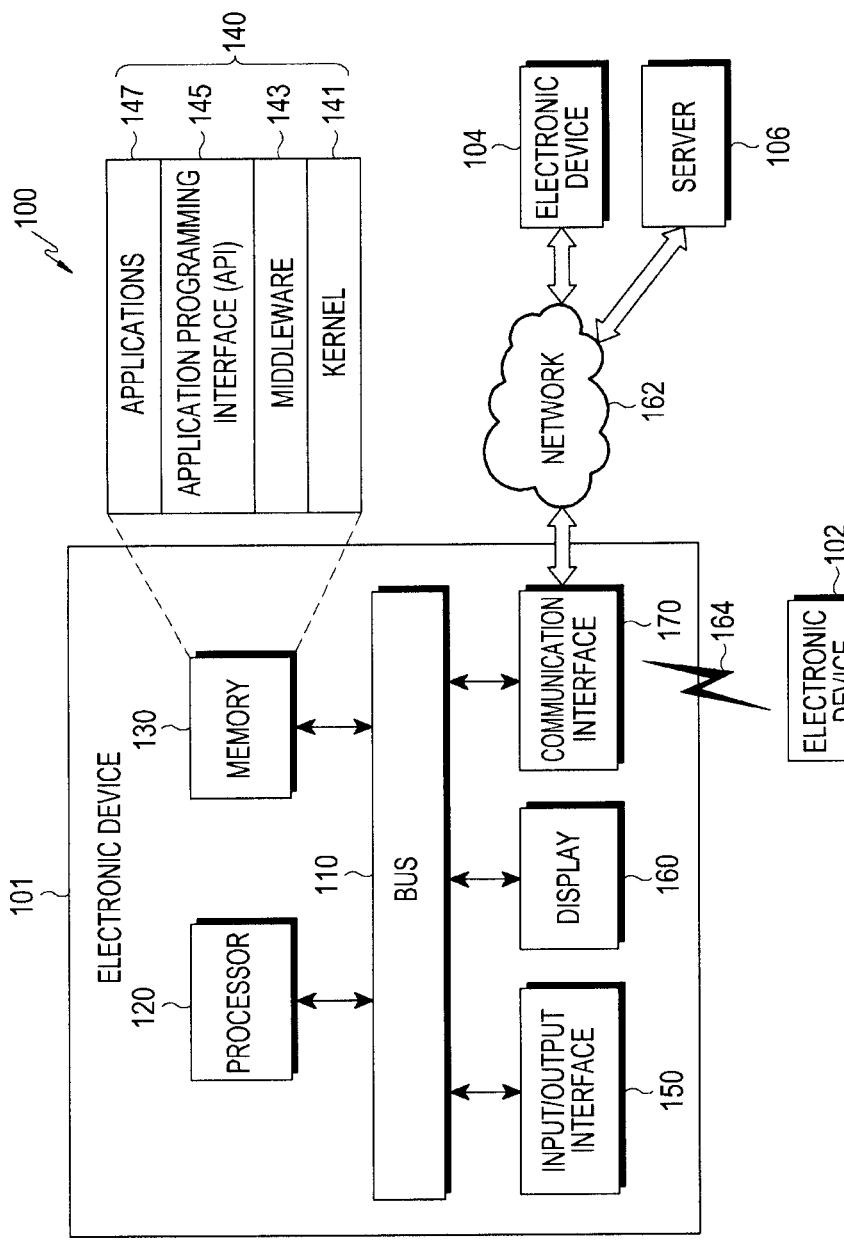
FIG. 1 is a block diagram illustrating a network environment and an electronic device according to various example embodiments.

Hereinafter, various embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments may utilize various components without implying an order and/or the importance of the components, and does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be flexible, or may be a combination of one or more of the aforementioned various devices. The electronic device according to an embodiment is not limited to the above described devices. In the present disclosure, the term "user" may indicate a person using an electronic device or a device (e.g., an artificial intelligence electronic device) using an electronic device.

FIG. 1 illustrates an electronic device 101 in a network environment 100 according to various example embodiments. The electronic device 101 may include a bus 110, a processor 120, a memory 130, an input/output interface 150, a display 160, and a communication interface 170. In some example embodiments, at least one of the components may be omitted, or other components may be further included in the electronic device 101. The bus 110 may include a circuit that connects the components 110 to 170 to each other and delivers communications (for example, control messages or data) between the components. The processor 120 may include one or more of a Central Processing Unit (CPU), an Application Processor (AP), and a Communication Processor (CP). The processor 120 may control, for example, at least one different component of the electronic device 101, and/or may perform operations relating to communication or data processing.

The memory 130 may include volatile and/or nonvolatile memory. The memory 130 may store, for example, one or more instructions or data related to at least one different component of the electronic device 101. According to one example embodiment, the memory 130 may store software and/or a program 140. The program 140 may include, for example, a kernel 141, middleware 143, an Application Programming Interface (API) 145, and/or an application (or "app") 147. At least part of the kernel 141, the middleware 143, and the API 145 may be designated as an Operating System (OS). The kernel 141 may control or manage system resources (for example, the bus 110, the processor 120, the memory 130, or the like) used to perform an operation or function implemented, for example, in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data. Further, the middleware 143 may process one or more requests for operations received from the application 147 according to the priority thereof. For example, the middleware 143 may assign at least one application 147 a priority for using a system resource of the electronic device 101 (for example, the bus 110, the processor 120, the memory 130, or the like) and may process the one or more requests for operations. The API 145 is an interface for the application 147 to control a function provided from the kernel 141 or the middleware 143, and may include, for example, at least one interface or function (for example, one or more instructions) for file control, window control, image processing, or text control. The input/output interface 150 may deliver one or more instructions or data, which is input from, for example, a user or a different external device, to a different component(s) of the electronic device 101, or may output one or more instructions or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, and/or a symbol) for the user. The display 160 may include a touch screen and may receive touch, gesture, proximity, or hovering input using, for example, an electronic pen or a body part of a user. The communication interface 170 may establish communication, for example, between the electronic device 101 and an external device (for example, a first external electronic device 102, a second external electronic device 104, or a server 106). For example, the communication interface 170 may be connected to a network 162 via wireless communication, indicated as element 164, or wired communication to communicate with the external device (for example, the second external electronic device 104 or the server 106).

The wireless communication may include cellular communication using, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to one example embodiment, the wireless communication may include an element 164 illustrated in FIG. 1, which is, for example, at least one of Wireless Fidelity (Wi-Fi), Light Fidelity (Li-Fi), Bluetooth, Bluetooth Low Energy (BLE), ZigBee, Near-Field Communication (NFC), Magnetic Secure Transmission (MST), Radio Frequency (RF), and a Body Area Network (BAN). According to one example embodiment, the wireless communication may include a Global Navigation Satellite System (GNSS). The GNSS may be, for example, a Global Positioning System (GPS), a Global Navigation Satellite System (GNSS), a BeiDou Navigation Satellite System (hereinafter, "BeiDou"), or Galileo, which is the European global satellite-based navigation system. In the present document, "GPS" may be interchangeably used with "GNSS". The wired communication may include, for example, at least one of Universal Serial Bus (USB), High-Definition Multimedia Interface (HDMI), Recommended Standard 232 (RS-232), Power Line Communication (PLC), and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

Each of the first and second external electronic devices 102 and 104 may be a device of a type that is the same as, or different from, that of the electronic device 101. According to various example embodiments, all or some of the operations performed in the electronic device 101 may be performed in another electronic device or a plurality of electronic devices (for example, the electronic devices 102 and 104 or the server 106). According to one example embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the result as it was received or after additionally processing the result. To this end, for example, cloud-computing, distributed-computing, or client-server-computing technologies may be used.

Figure 2:
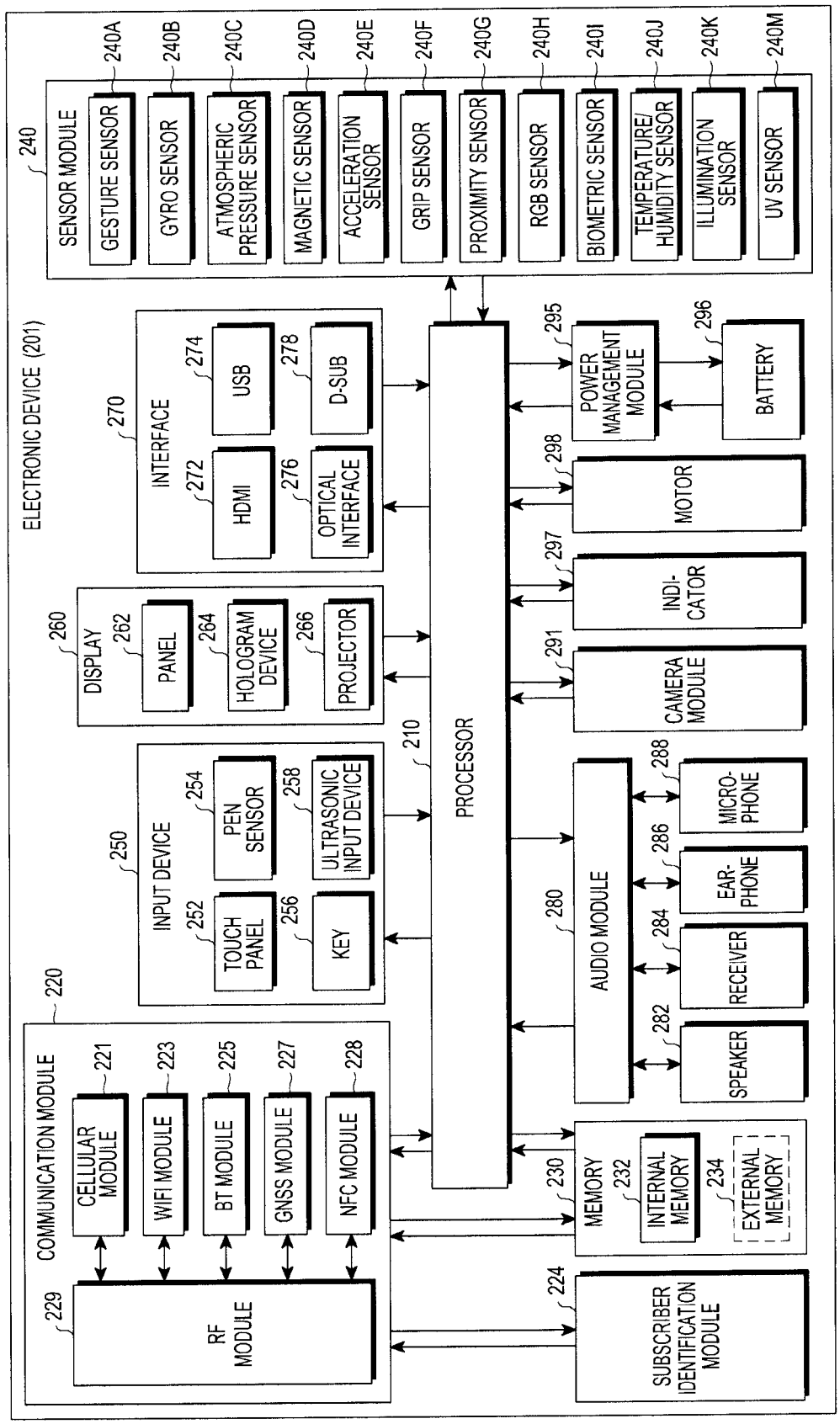
FIG. 2 is a block diagram of an electronic device according to various example embodiments.

FIG. 2 is a block diagram of an electronic device 201 according to various example embodiments. The electronic device 201 may include, for example, all or part of the electronic device 101 illustrated in FIG. 1. The electronic device 201 may include one or more processors (for example, APs) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processors 210 may run, for example, an operating system or an application to control a plurality of hardware or software components that are connected to the processors 210, and may perform various kinds of data processing and operations. The processors 210 may be configured, for example, as a System on Chip (SoC). According to one example embodiment, the processors 210 may further include a Graphic Processing Unit (GPU) and/or an image signal processor. The processors 210 may include at least some (for example, a cellular module 221) of the components illustrated in FIG. 2. The processors 210 may load one or more instructions or data received from at least one of other components (for example, a nonvolatile memory) into a volatile memory to process the one or more instructions or data, and may store resultant data in the nonvolatile memory.

The communication module 220 may have a configuration that is the same as, or similar to, that of the communication interface 170 of FIG. 1. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text messaging service, or an Internet service through a communication network. According to one example embodiment, the cellular module 221 may perform identification and authentication of the electronic device 201 in a communication network using a Subscriber Identity Module (SIM, for example, a SIM card) 224. According to one example embodiment, the cellular module 221 may perform at least some of the functions provided by the processors 210. According to one example embodiment, the cellular module 221 may include a CP. According to one example embodiment, at least some (for example, two or more) of the cellular module 221, the Wi-Fi module 223, the Bluetooth module 225, the GNSS module 227, and the NFC module 228 may be included in one Integrated Chip (IC) or IC package. The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module. The SIM 224 may include, for example, a card including a SIM or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, or a Solid-State Drive (SSD)). The external memory 234 may include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 234 may be functionally or physically connected to the electronic device 201 through various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one example embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response. The (digital) pen sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, the display 160) may include a panel 262, a hologram device 264, a projector 266, and/or a control circuit to control these components. The panel 262 may be configured, for example, to be flexible, transparent, or wearable. The panel 262 may be formed with the touch panel 252 in one or more modules. According to one example embodiment, the panel 262 may include a pressure sensor (or force sensor) to measure the strength of pressure of a user's touch. The pressure sensor may be formed with the touch panel 252 in a single body, or may be provided as one or more sensors separate from the touch panel 252. The hologram device 264 may display a three-dimensional image in the air using light interference. The projector 266 may project light onto a screen to display an image. The screen may be disposed, for example, inside or outside the electronic device 201. The interface 270 may include, for example, an HDMI 272, a USB 274, an optical interface 276, or a D-subminiature (D-sub) interface 278. The interface 270 may be included, for example, in the communication interface 170 illustrated in FIG. 1. Additionally or alternatively, the interface 270 may include, for example, a Mobile High-Definition Link (MHL) interface, an SD card/MMC interface, or an Infrared Data Association (IrDA) interface.

The audio module 280 may bidirectionally convert, for example, sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288. The camera module 291 is a device that takes, for example, a still image and a video. According to one example embodiment, the camera module 291 may include one or more image sensors (for example, a front sensor or a rear sensor), a lens, an Image Signal Processor (ISP), or a flash (for example, an LED, a xenon lamp, or the like). The power management module 295 may manage, for example, the power of the electronic device 201. According to one example embodiment, the power management module 295 may include a Power Management Integrated Circuit (PMIC), a charger IC, or a battery or fuel gauge. The PMIC may have wired and/or wireless charging methods. The wireless charging methods may include, for example, a magnetic-resonance method, a magnetic-induction method, or an electromagnetic-wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. The electronic device 201 may include a mobile-TV-supporting device (for example, a GPU) that is capable of processing media data in accordance with, for example, Digital Multimedia Broadcasting (DMB), Digital Video Broadcasting (DVB), or mediaFlo™ standards. Each element mentioned in the present document may include one or more components, and may be designated by different terms depending on the type of the electronic device. In various example embodiments, an electronic device (for example, the electronic device 201) may be configured such that some elements are omitted, additional elements are further included, or some of the elements are combined into one entity, which may perform the same functions as those of the corresponding elements before combination.

Figure 3:
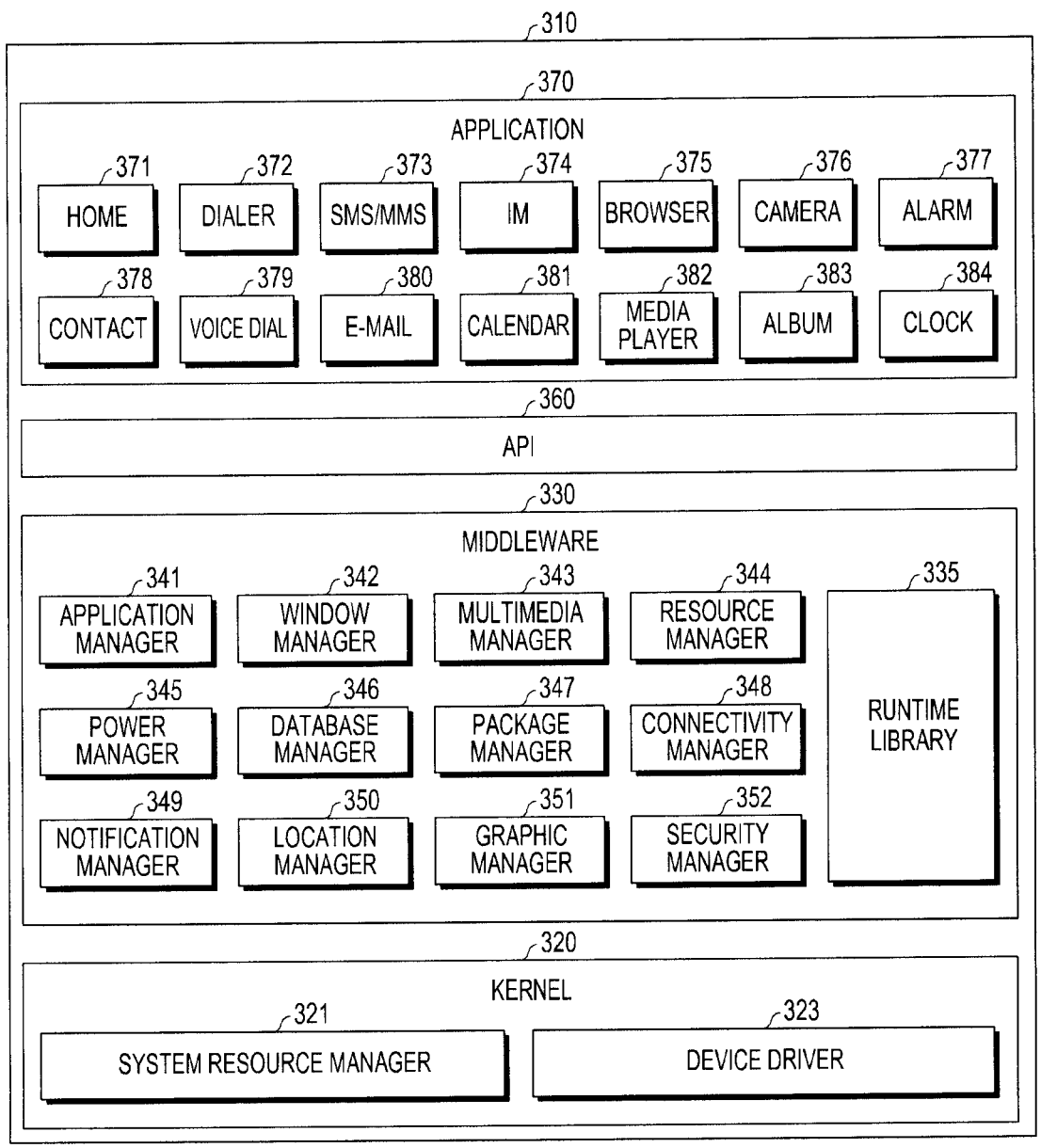
FIG. 3 is a block diagram of a program module according to various example embodiments.

FIG. 3 is a block diagram of a program module according to various example embodiments. According to one example embodiment, the program module 310 (for example, the program 140) may include an operating system that controls resources related to an electronic device (for example, the electronic device 101) and/or various applications (for example, the application 147) that run on the operating system. The operating system may include, for example, Android™, iOS™, Windows™, Symbian™, Tizen™, Bada™, or the like. Referring to FIG. 3, the program module 310 may include a kernel 320 (for example, the kernel 141), middleware 330 (for example, the middleware 143), an API 360 (for example, the API 145), and/or an application 370 (for example, the application 147). At least part of the program module 310 may be preloaded onto the electronic device or may be downloaded from an external electronic device (for example, the electronic device 102 or 104, the server 106, or the like).

The kernel 320 may include, for example, a system resource manager 321 and/or a device driver 323. The system resource manager 321 may perform control, allocation, or recovery of system resources. According to one example embodiment, the system resource manager 321 may include a process manager, a memory manager, or a file-system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, functions commonly needed for applications 370, or may provide an application 370 with various functions through the API 360 so that the application 370 may use the limited system resources in the electronic device. According to one example embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 335 may perform input/output management, memory management, or arithmetic function processing. The application manager 341 may manage, for example, the life cycle of the application 370. The window manager 342 may manage Graphic User Interface (GUI) resources used for a screen. The multimedia manager 343 may identify formats for playing media files, and may encrypt or decrypt a media file using a codec suitable for a corresponding format. The resource manager 344 may manage source code or memory space for the application 370. The power manager 345 may manage, for example, a battery capacity or power supply, and may provide information on power utilized for the operation of the electronic device. According to one example embodiment, the power manager 345 may interwork with a Basic Input/Output System (BIOS). The database manager 346 may generate, retrieve, or change a database to be used for, for example, the application 370. The package manager 347 may manage the installation or updating of an application distributed in the form of a package file.

The connectivity manager 348 may manage, for example, wireless connectivity. The notification manager 349 may provide a user with an event, for example, an incoming message, an appointment, and a proximity notification. The location manager 350 may manage, for example, information about the location of the electronic device. The graphic manager 351 may manage, for example, a graphic effect to be provided for the user or a user interface related to the graphic effect. The security manager 352 may provide, for example, system security or user authentication. According to one example embodiment, the middleware 330 may include a telephony manager to manage a voice or video call function of the electronic device or a middleware module that is capable of forming combinations of functions of the foregoing elements. According to one example embodiment, the middleware 330 may provide a specialized module for each operating system. The middleware 330 may dynamically delete some of the existing elements or add new elements. The API 360 is, for example, a set of API programming functions, and may be provided with a different configuration depending on the operating system. For example, one API set for each platform may be provided in Android or iOS, while two or more API sets for each platform may be provided in Tizen.

The application 370 may include, for example, a home screen 371, a dialer 372, an SMS/MMS 373, Instant Messaging (IM) 374, a browser 375, a camera 376, an alarm 377, an address book 378, a voice dialer 379, email 380, a calendar 381, a media player 382, an album 383, a clock 384, a healthcare application (for example, for measuring exercising or blood sugar), or an environmental data application (for example, for providing atmospheric pressure, humidity, or temperature data). According to one example embodiment, the application 370 may include an information exchange application that is capable of supporting information exchange between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device, or may receive notification information from the external electronic device and provide the notification information to the user. The device management application may install, delete, or update, for example, a function (for example, a function of turning on/turning off the external electronic device itself (or some components thereof) or adjusting the brightness (or resolution) of a display) of an external electronic device communicating with the electronic device or an application operating in the external electronic device. According to one example embodiment, the application 370 may include an application (for example, a healthcare application of a mobile medical device) assigned according to the attributes of the external electronic device. According to one example embodiment, the application 370 may include an application received from the external electronic device. At least part of the program module 310 may be implemented (for example, run) by software, firmware, hardware (for example, the processors 210), or combinations of at least two or more thereof, and may include a module, a program, a routine, sets of instructions, or a process to perform one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
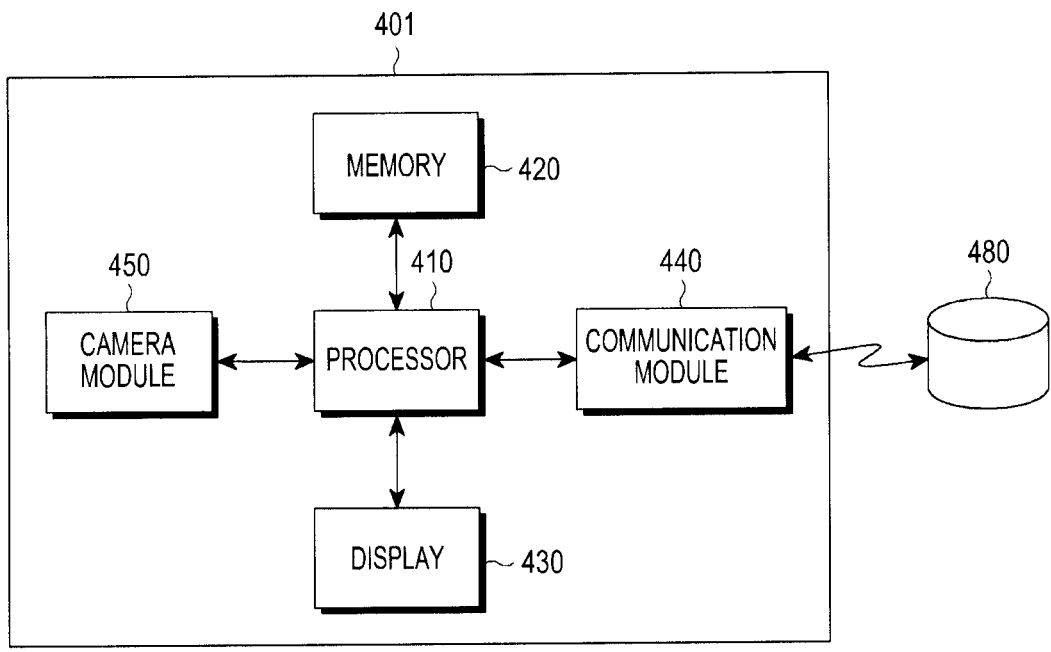
FIG. 4 is a schematic block diagram of an electronic device according to various example embodiments.

FIG. 4 is a schematic block diagram of an electronic device according to various example embodiments.

Referring to FIG. 4, the electronic device 401 may include a processor 410, a memory 420, a display 430, a communication module 440, and a camera module 450.

The electronic device 401 may be configured to be substantially the same as or similar to the electronic device 101 of FIG. 1 or the electronic device 201 of FIG. 2. For example, the electronic device 401 may be configured as a computing device, such as a PC, a tablet PC, and/or a smartphone.

The processor 410 may control the overall operation of the electronic device 401.

According to an example embodiment, the processor 410 may obtain an image of a wallpaper of a wearable device (for example, a watch face of a smart watch). For example, the processor 410 may obtain the image of the wallpaper of the wearable device (for example, the watch face of the smart watch) stored in the memory 420. The processor 410 may obtain the image of the wallpaper of the wearable device (for example, the watch face of the smart watch) from an external electronic device 480 through the communication module 440. The processor 410 may obtain the image of the wallpaper of the wearable device (for example, the watch face of the smart watch) through the camera module 450.

The smart watch may be a wearable device that is a watch capable of performing various functions (for example, a wireless communication function and an application execution function) that are expanded beyond those of an ordinary watch. For example, the smart watch may be a wearable computing device that implements an ordinary watch function and various other functions. The watch face may be a watch screen or wallpaper that performs a watch function of the smart watch.

According to an example embodiment, the processor 410 may analyze the image of the wallpaper of the wearable device (for example, the watch face of the smart watch) and may provide information on a first electronic device (for example, a wearable device) matching the wallpaper of the wearable device (for example, the watch face of the smart watch) according to the analysis result. For example, the processor 410 may determine the first electronic device (or a component of the first electronic device) among a plurality of electronic devices (for example, a plurality of wearable devices) based on the image of the watch face, and may display, on the display 430, the image of the first electronic device in relation to the image of the watch face.

According to an example embodiment, the processor 410 may provide information on a component of the first electronic device (for example, the wearable device) matching the wallpaper of the wearable device (for example, the watch face of the smart watch). For example, the processor 410 may provide information on the form, material, size, and/or color of a cover, a bezel, and/or a connector included in the first electronic device (for example, the wearable device).

According to an example embodiment, the processor 410 may determine the first electronic device (for example, the wearable device) corresponding to the image among the plurality of electronic devices (for example, the plurality of wearable devices) stored in the memory 420 based on the form of the image of the wallpaper of the wearable device (for example, the watch face of the smart watch) and a plurality of objects included in the image. The processor 410 may provide the information on the first electronic device (or the component of the first electronic device) among the plurality of electronic devices through the display 430.

The plurality of electronic devices may be configured as a plurality of wearable devices. Further, the first electronic device may be configured as a wearable device. For example, the first electronic device may be configured as a smart watch and/or an activity tracker.

The wallpaper of the wearable device may be a background screen (or background image) displayed on a display included in the wearable device. For example, the wallpaper of the wearable device may include a watch face of a smart watch and/or a background screen of an activity tracker.

The plurality of objects may include characters, a shape, an indicator, a watch hand, a watch, a figure, and/or a picture.

In the following description, for convenience of explanation, it is assumed that the plurality of electronic devices is a plurality of smart watches and that the first electronic device is a first smart watch. However, the technical idea of the present disclosure is not limited to this example, and the plurality of electronic devices and the first electronic device may be any of various wearable devices.

The plurality of smart watches may be respectively different smart watches. For example, the plurality of smart watches may be smart watches of different colors, different levels of brightness or transparency, or different materials, shapes, bezels, and/or sizes.

The processor 410 may determine the first smart watch corresponding to the resolution of the image among the plurality of smart watches based on the resolution of the image of the watch face.

The processor 410 may determine the first smart watch corresponding to the image among the plurality of smart watches based on the size and number of the plurality of objects included in the image of the watch face.

The processor 410 may determine the first smart watch among the plurality of smart watches based on the material of a background included in the image of the watch face.

The processor 410 may determine the first smart watch among the plurality of smart watches based on the color of the image of the watch face.

The processor 410 may obtain information on the image of the watch face from the external electronic device 480 through the communication module 440. The processor 410 may determine the first smart watch among the plurality of smart watches based on the obtained information on the image.

The processor 410 may determine a first peripheral device (for example, a first strap) among a plurality of peripheral devices (for example, a plurality of straps) related to the determined first smart watch based on the image of the watch face and the determined first smart watch. For example, the processor 410 may determine the material and color of the first peripheral device based on the image of the watch face and the determined first electronic device. Further, the processor 410 may provide information on the determined first peripheral device through the display 430. For example, the first peripheral device may include a strap attached to a smart watch or an activity tracker.

In the following description, for convenience of explanation, it is assumed that the plurality of peripheral devices is the plurality of straps and that the first peripheral device is a first strap. However, the technical idea of the present disclosure is not limited to this example.

The plurality of straps may be different straps. For example, the plurality of straps may be straps of different colors, different levels of brightness or transparency, or different materials (for example, leather, metal, or silicone), shapes, bezels, and/or sizes.

According to an example embodiment, the processor 410 may determine a second smart watch, which is different from the first smart watch, among the plurality of smart watches in response to an event. Further, the processor 410 may provide information on the determined second smart watch through the display 430. The event may be, for example, an event for displaying the information on the second smart watch, which is different from the first smart watch determined by the processor 410. For example, the second smart watch may be a smart watch that is different from the first smart watch and matches the image of the watch face.

According to an example embodiment, the processor 410 may determine a second strap, which is different from the first strap, among the plurality of straps in response to an event. Further, the processor 410 may provide information on the determined second strap through the display 430. For example, the second strap may be a strap that is different from the first strap and matches the image of the watch face and the second smart watch.

The memory 420 may store data related to the operation of the electronic device 401.

According to an example embodiment, the memory 420 may store the image of the watch face. The memory 420 may store information on the plurality of smart watches. Further, the memory 420 may store information on the plurality of straps related to the plurality of smart watches.

The display 430 may display information on a smart watch matching the image of the watch face under the control of the processor 410. The display 430 may also display information on a strap matching the watch face and the smart watch under the control of the processor 410.

The communication module 440 may obtain information on a watch face from the external electronic device 480 under the control of the processor 410. The communication module 440 may transmit the obtained information on the watch face to the processor 410.

The camera module 450 may photograph a watch face and may capture an image of the photographed watch face. The camera module 450 may transmit the captured image of the watch face to the processor 410.

According to an example embodiment, the external electronic device 480 may store an image of a watch face. The external electronic device may transmit the image of the watch face to the electronic device 401 in response to a request from the electronic device 401. Further, the external electronic device 480 may store information on at least one electronic device among the plurality of electronic devices. The external electronic device 480 may transmit the information on the at least one electronic device among the plurality of electronic devices to the electronic device 401 in response to a request from the electronic device 401. For example, the external electronic device 480 may be configured to be substantially the same as or similar to the electronic device 102 of FIG. 1.

Figure 5:
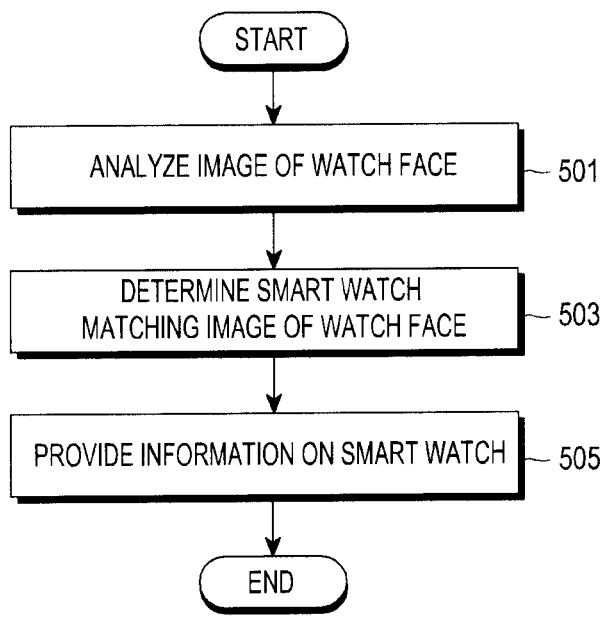
FIG. 5 is a flowchart illustrating the operation of an electronic device according to various example embodiments.

FIG. 5 is a flowchart illustrating the operation of an electronic device according to various example embodiments.

Referring to FIG. 5, a processor 410 (for example, the processor 410 of FIG. 4) may obtain an image of a watch face and may analyze the image of the watch face (501). For example, the processor 410 may analyze the image based on the form depicted within the image and a plurality of objects included in the image.

The processor 410 may determine a first smart watch (e.g., an indicator of a corresponding visual representation for a watch face) corresponding to the image of the watch face from among a plurality of known smart watches (503). For example, the processor 410 may determine the particular first smart watch (or a component of the first smart watch face design) that matches the obtained image of the watch face.

The processor 410 may provide information on the first smart watch through a display 430 (for example, the display 430 of FIG. 4) (505). For example, the processor 410 may display, on the display 430, an image of the first smart watch (or generate display of one or more of the components of the first smart watch) based on the obtained image of the smart watch face.

Figure 6:
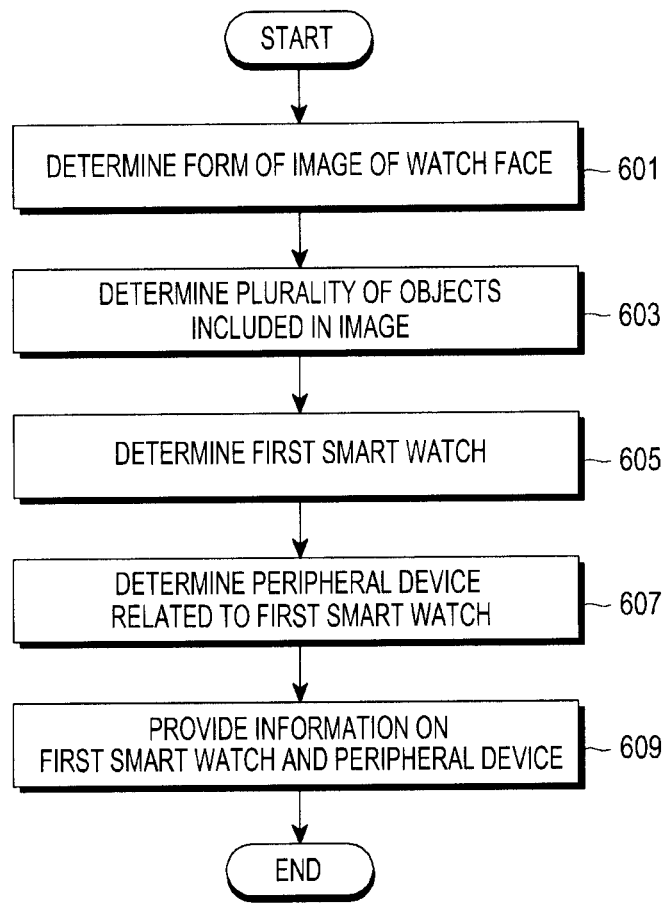
FIG. 6 is a flowchart illustrating the operation of an electronic device according to various example embodiments.

FIG. 6 is a flowchart illustrating the operation of an electronic device according to various example embodiments.

Referring to FIG. 6, a processor 410 (for example, the processor 410 of FIG. 4) may determine the form of an image of a watch face (601). For example, the processor 410 may detect (e.g., and/or determine) the form and resolution of the image of the watch face. For example, the resolution of the image may be set at a designated resolution value. Specifically, for example, the resolution of the image may be one of 320*320, 360*360, 360*480, and/or 216*432 pixels.

The processor 410 may detect (e.g., and/or determine) a plurality of objects included in the obtained image of the watch face (603). For example, the processor 410 may determine the size, number, distribution, and/or form of the plurality of objects included in the image of the watch face, such as the bezel, the lug, one or more hands, the dial, sub-dials, straps, buckles and other couplers, any text or numerical markings, designs or images and/or symbolic and/or demarcating markings thereof.

The processor 410 may detect (e.g., determine) a known first smart watch that matches the watch face, based on characteristics of the watch face depicted in the image, which may include the plurality of objects (e.g., hands, bezel, lug, dials, etc.) depicted in the obtained image of the watch face (605). For example, the processor 410 may detect a match by comparison of known components of the first smart watch with one or more of the plurality of objects included in the image of the watch face.

The processor 410 may determine a "peripheral" device related to the first smart watch, such as a strap related to the first smart watch (or a component of the first smart watch) (607). For example, the processor 410 may detect (e.g., determine) a match with a known first strap from among a plurality of known straps based on the obtained image of the watch face and known characteristics of the first smart watch (e.g., such as the known component of the first smart watch).

The processor 410 may provide information on the first smart watch and the first strap through a display 430 (609). For example, the processor 410 may display, on the display 430, images of the first smart watch and the first strap in relation to the image of the watch face.

Figure 7:
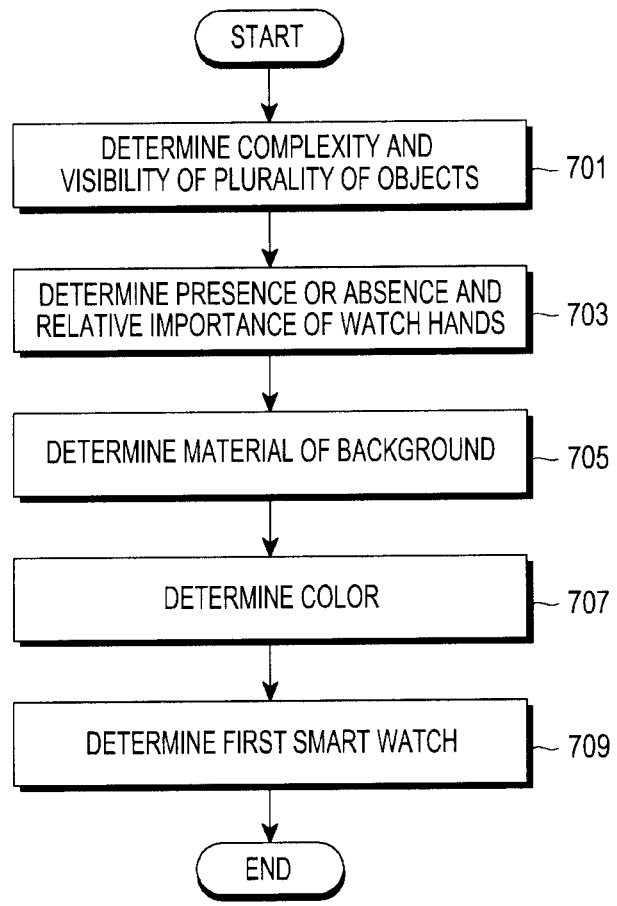
FIG. 7 is a flowchart illustrating an operation in which an electronic device determines a smart watch according to various example embodiments.

FIG. 7 is a flowchart illustrating an operation in which an electronic device determines a smart watch according to various example embodiments.

Referring to FIG. 7, a processor 410 (for example, the processor 410 of FIG. 4) may determine the complexity and visibility of a plurality of objects depicted in an image of a watch face (701).

For example, the processor 410 may detect (e.g., determine) the complexity of the watch face based on a counted number of the plurality of objects included in the image of the watch face. Specifically, the processor 410 may determine that the complexity of the watch face is higher (i.e., more complex) as the counted number of the plurality of objects included in the image of the watch face increases. Also, the processor 410 may determine that the complexity of the watch face is lower (i.e., less complex) for a watch face having a smaller number of counted objects depicted within. The processor may detect the complexity by selecting a ranking according to a pre-stored association between a counted number of objects and a particular ranking for the complexity.

For example, the processor 410 may determine the visibility of the watch face based on a respective size of each of the plurality of objects included in the image of the watch face. For example, the processor 410 may determine that visibility of the watch face is higher (i.e., better) as the average size of each of the plurality of objects included in the image of the watch face increases. Further, the processor 410 may determine that the visibility of the watch face is lower (i.e., worse) as the average size of each of the plurality of objects included in the image of the watch face is smaller. For example, the size of each object may be determined from the image, and an average of the various sizes may be calculated which may indicate directly or by association a particularly visibility value.

The processor 410 may determine whether a watch hand (for example, an hour hand, a minute hand, and/or a second hand) is included in the image of the watch face (703). When a watch hand is included, the processor 410 may determine the relative importance of the watch hand in the image of the watch face (703). For example, the processor 410 may determine a relative importance value of the watch hand based on the number and distribution of watch hands and digital watches. For example, a thickness and length of the watch hand may be detected and used to look up a relative importance value previously associated with a particular matching thickness and length, thereby arriving at a relative importance value.

For example, when there is a digital watch without any watch hands, the processor 410 may determine that the relative importance value of the watch hands is low (e.g., zero, based on a zero length and zero width). Further, when the number of watch hands is lower than the number of digital watch displays, the processor 410 may determine that the relative importance of the watch hands is "low." For example, a table of relative importance values associating length and widths of watch hands with specific values may further include entries for a count of the number of watch hands, and further a count of watch hands relative to a count of digital watch displays. Conversely, when the number of watch hands is greater than the number of digital watches, the processor 410 may determine that the relative importance of the watch hands is high, and based on associations indicated in the table, a higher relative importance value may be selected.

In further embodiments, when watch hands are present and disposed substantially proximate to a central area of the watch face, the processor 410 may determine that the relative importance of the watch hands is higher, based on associations indicated in the table regarding central proximity of the watch hand.

The processor 410 may determine the material of a background of the image of the watch face (705). For example, the processor 410 may determine the material of the background of the image of the watch face and may determine whether the determined material is metallic. Specifically, the processor 410 may divide an image of the background into a plurality of areas and may compare the areas, thereby determining whether the background is metallic.

The processor 410 may determine the color of the image of the watch face (707). Further, the processor 410 may determine the brightness of the image of the watch face. For example, the processor 410 may determine the color and/or brightness of the image of the watch face using histogram analysis.

The processor 410 may determine a first smart watch matching the image of the watch face (709). For example, the processor 410 may determine the first smart watch (or a component of the first smart watch) among a plurality of smart watches based on at least one of the complexity and visibility of the plurality of objects included in the image of the watch face, the presence or absence and relative importance of a watch hand, the material of the background, and the color and brightness of the image of the watch face.

The processor 410 may determine a first strap related to the first smart watch (or the component of the first smart watch) (711). For example, the processor 410 may determine the first strap based on the determined first smart watch (or the component of the first smart watch) and the image of the watch face. Similarly, the processor 410 may determine the first strap, among a plurality of straps based on at least one of the complexity and visibility of the plurality of objects included in the image of the watch face, the presence or absence and relative importance of a watch hand, the material of the background, and the color and brightness of the image of the watch face.

The processor 410 may provide information on the first smart watch and the first strap through a display 430. For example, the processor 410 may display, on the display 430, images of the first smart watch and the first strap in relation to the obtained image of the watch face. That is, the obtained watch face may be visually simulated, component by component, for display.

Figure 8:
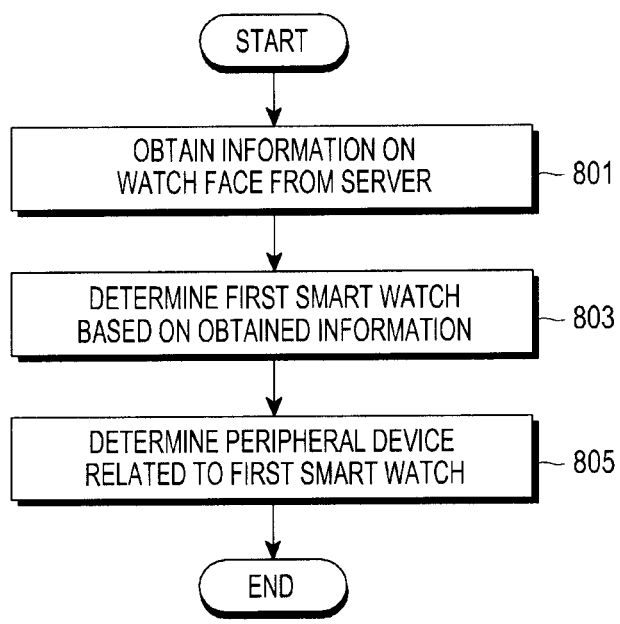
FIG. 8 is a flowchart illustrating the operation of an electronic device according to various example embodiments.

FIG. 8 is a flowchart illustrating the operation of an electronic device according to various example embodiments.

Referring to FIG. 8, a processor 410 (for example, the processor 410 of FIG. 4) may obtain an image of a watch face. That is, the processor 410 may obtain (e.g., retrieve) information on the watch face from an external electronic device (e.g., the external electronic device 480 of FIG. 4) in operation 801. For example, the information on the watch face stored in the external electronic device 480 may include tag information, category information, resolution information, form information (i.e., shape, characteristics, components, etc.), support smart watch information, and/or color information about the watch face.

The processor 410 may determine a first smart watch among a plurality of smart watches based on the watch face information obtained from the external electronic device 480 (803). Further, the processor 410 may determine the first smart watch among the plurality of smart watches based on the result of analyzing the image of the watch face and the information on the watch face obtained from the external electronic device 480.

The processor 410 may determine a first peripheral device (for example, a strap) related to the first smart watch based on the obtained information on the watch face and the first smart watch (805).

Figure 9:
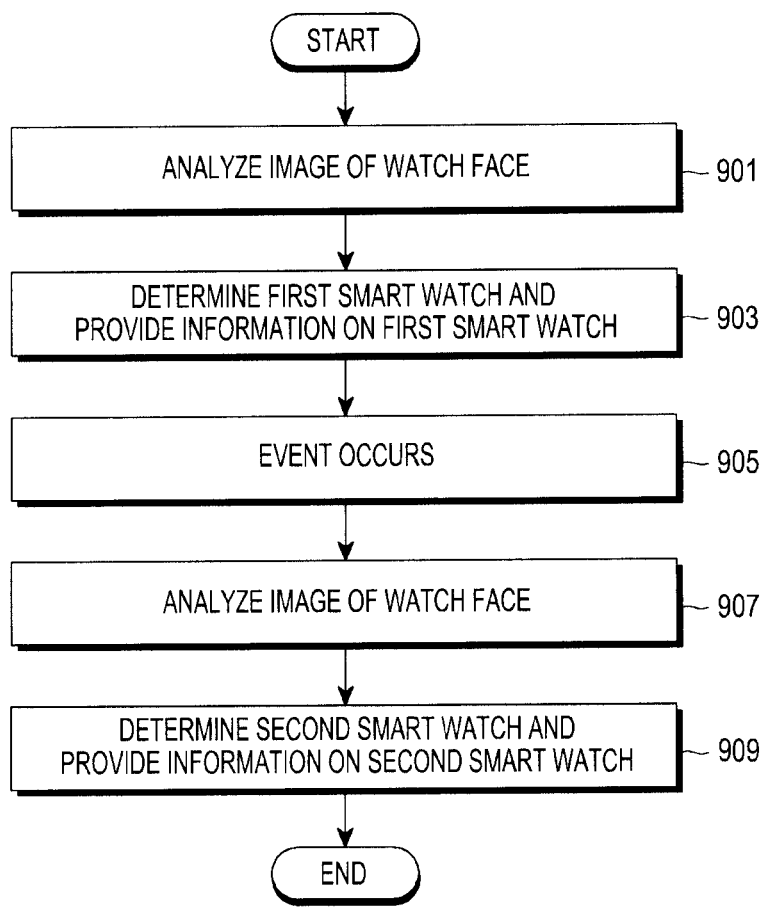
FIG. 9 is a flowchart illustrating the operation of an electronic device according to various example embodiments.

FIG. 9 is a flowchart illustrating the operation of an electronic device according to various example embodiments.

Referring to FIG. 9, a processor 410 (for example, the processor 410 of FIG. 4) may analyze an image of a watch face (901).

The processor 410 may detect a matching first smart watch (or a matching component of the first smart watch) from among a known plurality of smart watches having visual characteristics matching the image of the watch face (903). The processor may provide information on the detected first smart watch (or the detected component of the first smart watch) (903). For example, the processor 410 may display, on a display 430, an image of the detected first smart watch in relation to the image of the watch face.

The processor 410 may detect (e.g., determine) a first strap from among a known plurality of straps matching a strap depicted in the image of the watch face and attached to the first smart watch (or the component of the first smart watch). The processor 410 may display, on the display 430, images of the detected first smart watch and the detected first strap in relation to the image of the watch face.

When an event occurs, the processor 410 may detect the occurrence of some pre-designated event (905). For example, the designated event may be an operation in which information on a smart watch different from the first smart watch is requested. Specifically, the event may be detection of an input signal requesting information on a smart watch other than the first smart watch.

For example, when the input signal is received, the processor 410 may determine that that the predetermined event has occurred. Further, in other embodiments, when a previously designated program is executed, the processor 410 may determine that the event has occurred.

The processor 410 may analyze the image of the watch face in response to the occurrence of the event (907).

The processor 410 may determine a second smart watch (or a component of the second smart watch), which is different from the first smart watch, from among the plurality of smart watches based on the image of the watch face (909). The processor 410 may provide information on the second smart watch (or the component of the second smart watch). For example, the processor 410 may display, on the display 430, an image of the second smart watch in relation to the image of the watch face.

The processor 410 may determine a second strap from among the known plurality of straps based on the image of the watch face and the second smart watch (or the component of the second smart watch). For example, the second strap may be a strap that is the same as or different from the first strap.

The processor 410 may display, on the display 430, images of the second smart watch and the second strap in relation to the image of the watch face.

FIGS. 10A to 10F are block diagrams illustrating the operation of an electronic device according to various example embodiments.

Figure 10A:
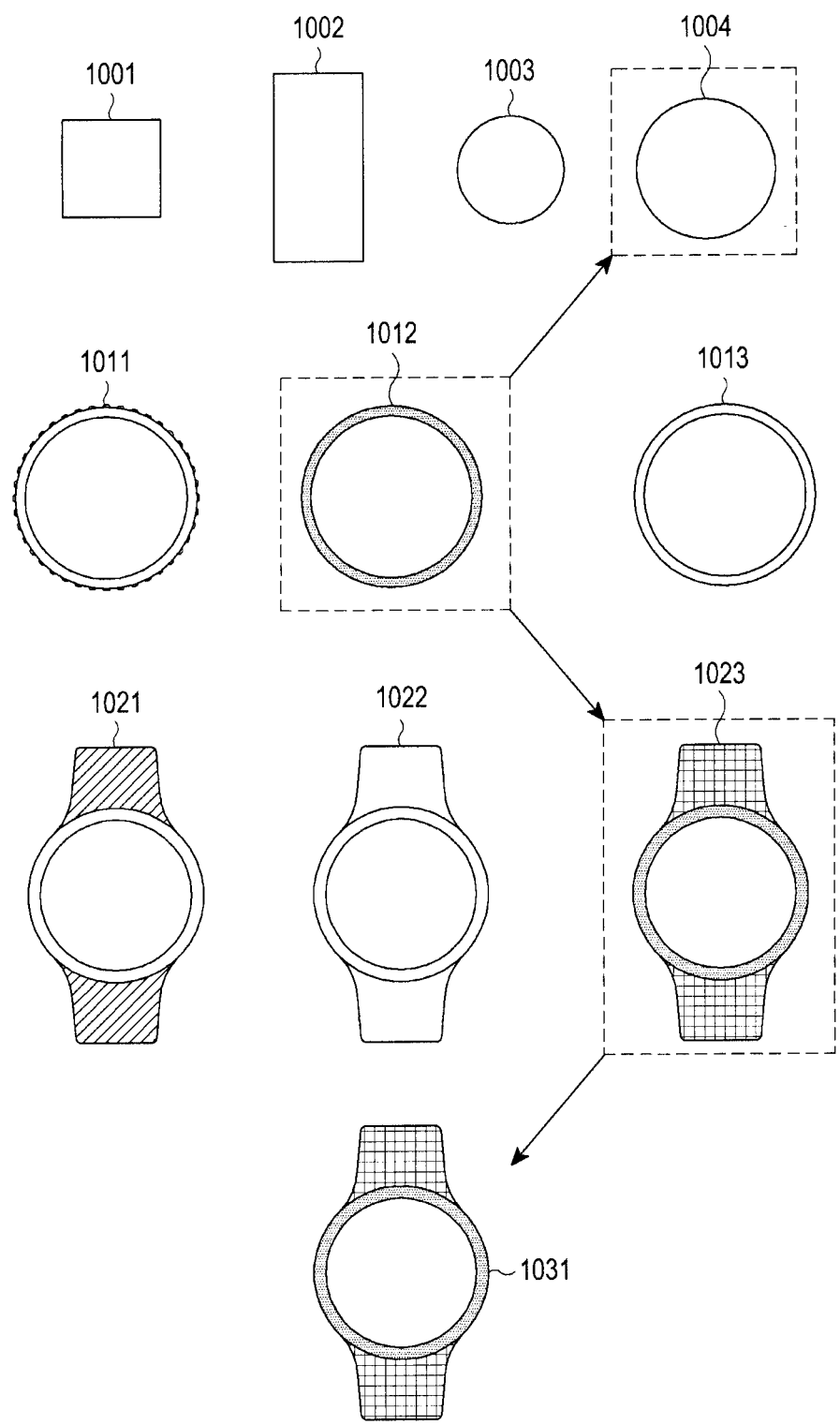
FIG. 10A, FIG. 10B, FIG. 10C, FIG. 10D, FIG. 10E, and FIG. 10F are block diagrams illustrating the operation of an electronic device according to various example embodiments.

Referring to FIG. 10A, a processor 410 (for example, the processor 410 of FIG. 4) may determine the form and resolution of an image of a watch face. For example, the processor 410 may determine, based on the resolution of the image of the watch face, whether the image of the watch face matches one of a plurality of known forms (i.e., outer bezels), such as a first form 1001, a second form 1002, a third form 1003, or a fourth form 1004, as depicted in FIG. 10A. For instance, in one example, the processor 410 may determine that the image of the watch face matches the fourth form 1004.

The processor 410 may determine a first smart watch matching the watch face based on a plurality of objects included in the image of the watch face, a background image, the presence or absence and relative importance of a watch hand, and/or the color and brightness. For example, the processor 410 may determine the first smart watch 1012 that matches the image of the watch face among a plurality of smart watches 1011, 1012, and 1013.

The processor 410 may determine a first strap based on the image of the watch face and the first smart watch 1012. For example, the processor 410 may determine the first strap 1023 that matches the image of the watch face and the first smart watch among a plurality of straps 1021, 1022, and 1023.

The processor 410 may display, on a display 430, an image 1031 that combines the image of the watch face with images of the first smart watch and the first strap.

Figure 10B:
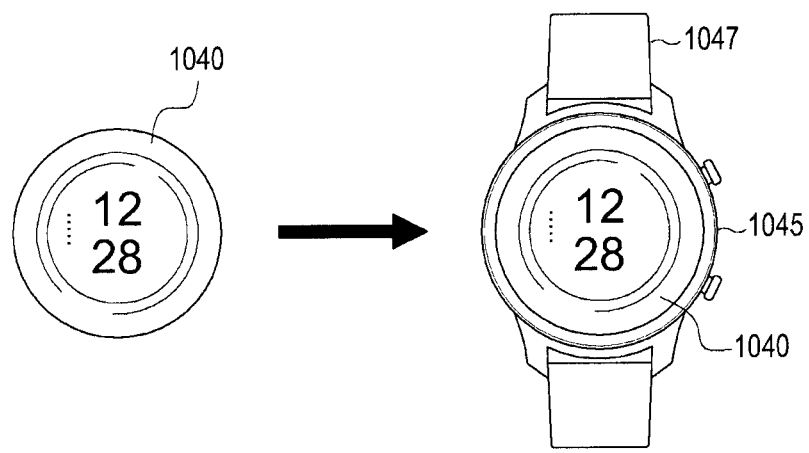

Referring to FIG. 10B, the processor 410 may analyze a first image 1040 of a watch face and may determine a first smart watch 1045 matching the first image 1040 according to the analysis result.

For example, the processor 410 may determine that the first image has a circular form based on the resolution of the first image 1040. The processor 410 may determine a complexity value and visibility value based on the first image 1040 showing a watch face that is simple and clearly visible, based on the respective size and number of objects included in the first image 1040, as described above. The processor 410 may determine that the background of the first image 1040 has low metallicity. The processor 410 may determine that the first image 1040 does not include a watch hand. The processor 410 may determine that the color of the first image 1040 is dark. The processor 410 may determine the first smart watch 1045 matching the first image 1040 based on the determination results. For example, the processor 410 may determine the first smart watch 1045 that includes a bright color, a nonmetallic material, and a bezel in a simple form.

The processor 410 may determine a first strap 1047 based on the first image 1040 and the first smart watch 1045. For example, the processor 410 may determine the first strap 1047 includes a silicone material and a dark color based on the first image 1040 and the first smart watch 1045.

Figure 10C:
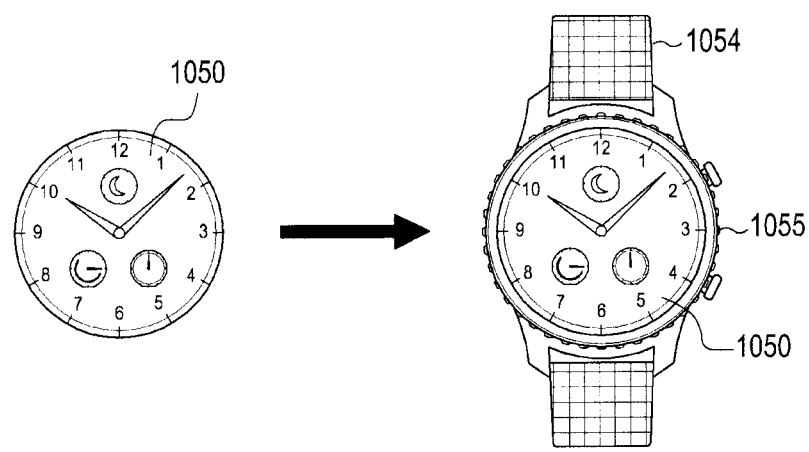

Referring to FIG. 10C, the processor 410 may analyze a second image 1050 of a watch face and may determine a second smart watch 1055 matching the second image 1050 according to the analysis result.

For example, the processor 410 may determine that the second image 1050 has a circular form based on the resolution of the second image 1050. The processor 410 may determine complexity and visibility values corresponding to the fact that the second image 1050 is complex, and not clearly visible based on the size and number of objects included in the second image 1050. The processor 410 may determine that the background of the second image 1050 has high metallicity. The processor 410 may determine that the second image 1050 includes a watch hand and that the relative importance of the watch hand is high. The processor 410 may determine that the color of the second image 1050 is dark. The processor 410 may determine the second smart watch 1055 matching the second image 1050 based on the determination results. For example, the processor 410 may determine the second smart watch 1055 having a dark color, a metallic material, and a bezel in a complex form.

The processor 410 may determine a second strap 1054 based on the second image 1050 and the second smart watch 1055. For example, the processor 410 may determine the second strap 1054 that includes a metallic material and a bright color based on the second image 1050 and the second smart watch 1055.

Figure 10D:
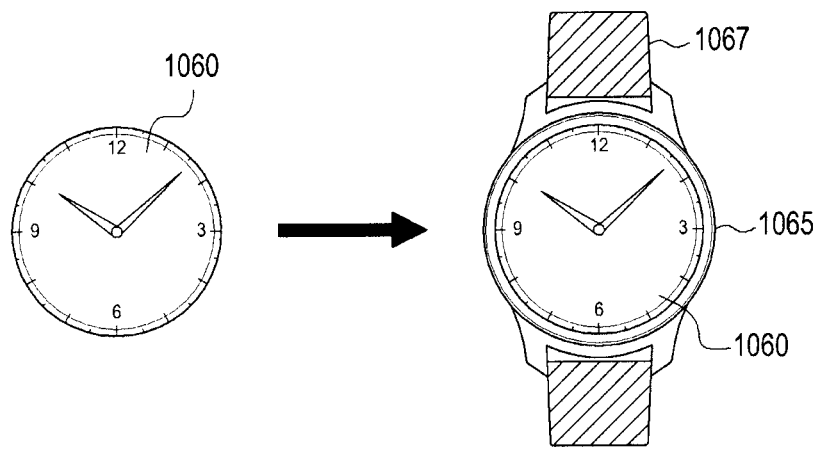

Referring to FIG. 10D, the processor 410 may analyze a third image 1060 of a watch face, and may determine a third smart watch 1065 matching the third image 1060 according to the analysis result.

For example, the processor 410 may determine that the third image 1060 has a circular form based on the resolution of the third image 1060. The processor 410 may determine complexity and visibility values representing the fact that the third image 1060 is simple and not clearly visible based on the size and number of objects included in the third image 1060. The processor 410 may determine that the background of the third image 1060 has high metallicity. The processor 410 may determine that the third image 1060 includes a watch hand and that the relative importance of the watch hand is high. The processor 410 may determine that the color of the third image 1060 is bright. The processor 410 may determine the third smart watch 1065 matching the third image 1060 based on the determination results. For example, the processor 410 may determine the third smart watch 1065 having a bright color, a metallic material, and a bezel in a simple form.

The processor 410 may determine a third strap 1067 based on the third image 1060 and the third smart watch 1065. For example, the processor 410 may determine the third strap 1067 that includes a leather material and a dark color based on the third image 1060 and the third smart watch 1065.

Figure 10E:
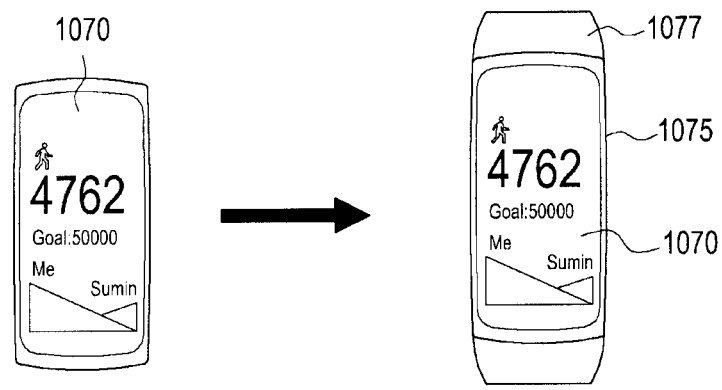

Referring to FIG. 10E, the processor 410 may analyze a fourth image 1070 of a watch face and may determine a fourth smart watch 1075 matching the fourth image 1070 according to the analysis result.

For example, the processor 410 may determine that the fourth image 1070 has a first rectangular form based on the resolution of the fourth image 1070. The processor 410 may determine complexity and visibility values representing the fact that the fourth image 1070 is complex and clearly visible based on the size and number of objects included in the fourth image 1070. The processor 410 may determine that the background of the fourth image 1070 has low metallicity. The processor 410 may determine that the fourth image 1070 does not include any watch hands. The processor 410 may determine that the color of the fourth image 1070 is dark. The processor 410 may determine the fourth smart watch 1075 matching the fourth image 1070 based on the determination results. For example, the processor 410 may determine the fourth smart watch 1075 having a dark color, a nonmetallic material, and a bezel in a simple form.

The processor 410 may determine a fourth strap 1077 based on the fourth image 1070 and the fourth smart watch 1075. For example, the processor 410 may determine the fourth strap 1077 that includes a silicone material and a dark color based on the fourth image 1070 and the fourth smart watch 1075.

Figure 10F:
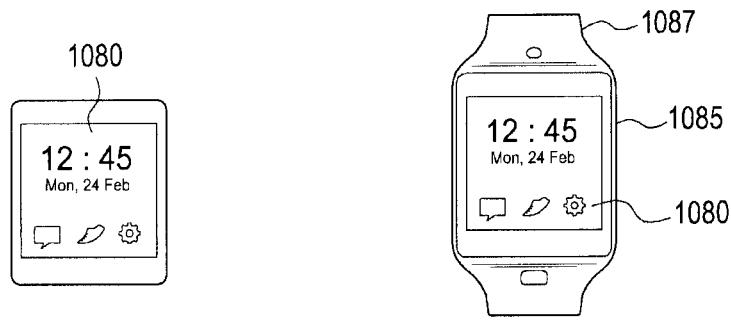

Referring to FIG. 10F, the processor 410 may analyze a fifth image 1080 of a watch face and may determine a fifth smart watch 1085 matching the fifth image 1080 according to the analysis result.

For example, the processor 410 may determine that the fifth image 1080 has a second rectangular form based on the resolution of the fifth image 1080. The processor 410 may determine complexity and visibility values based on the fact that the fifth image 1080 is simple and clearly visible based on the size and number of objects included in the fifth image 1080. The processor 410 may determine that the background of the fifth image 1080 has high metallicity. The processor 410 may determine that the fifth image 1080 does not include a watch hand. The processor 410 may determine that the color of the fifth image 1080 is bright. The processor 410 may determine the fifth smart watch 1085 matching the fifth image 1080 based on the determination results. For example, the processor 410 may determine the fifth smart watch 1085 that includes a bright color, a metallic material, and a bezel in a simple form.

The processor 410 may determine a fifth strap 1087 based on the fifth image 1080 and the fifth smart watch 1085. For example, the processor 410 may determine the fifth strap 1087 that includes a silicone material and a bright color based on the fifth image 1080 and the fifth smart watch 1085.

Figure 11A:
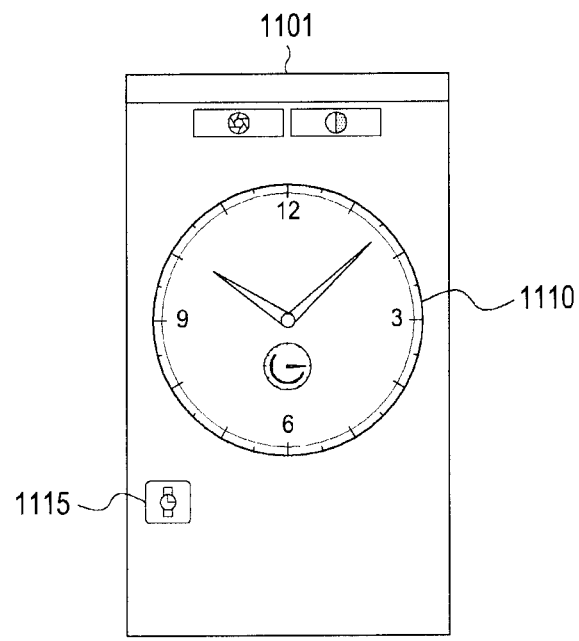
FIG. 11A, FIG. 11B, and FIG. 11C illustrate user interfaces provided by an electronic device according to various example embodiments.
Figure 11B:
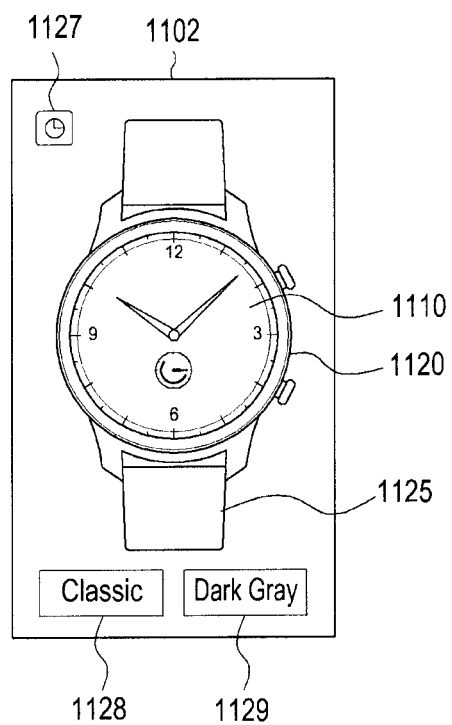
Figure 11C:
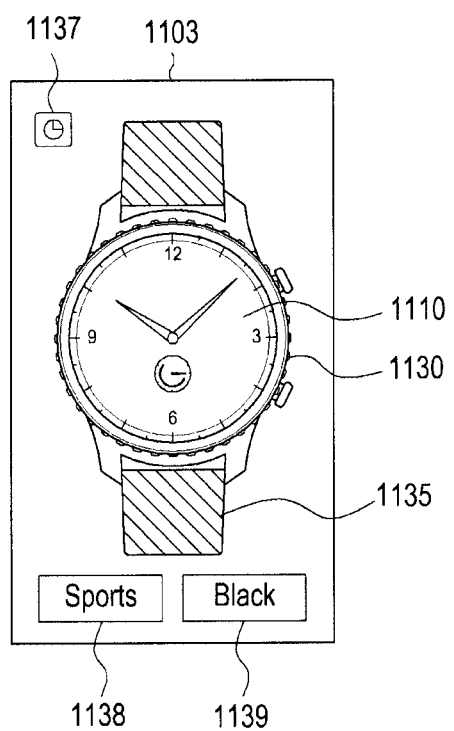

FIGS. 11A to 11C illustrate user interfaces provided by an electronic device according to various example embodiments.

Referring to FIG. 11A, a processor 410 (for example, the processor 410 of FIG. 4) may display a first user interface 1101.

The first user interface 1101 may display an image 1110 of a watch face and a first object. For example, the image 1110 of the watch face as displayed may be retrieved from a memory 420 or obtained through an external electronic device 480 through a communication module 440. The image 1110 of the watch face may also be captured through a camera module 450.

The first object 1115 may be, for example, an object selectable to analyze the image 1110 of the watch face and requesting information about a smart watch and a strap that match the image of the watch face. For example, when an input selecting the first object 1115 is detected, the processor 410 may analyze the image 1110 of the watch face and may provide information about a physical real-world smart watch and a strap that match the depicted image 1110 of the watch face.

Referring to FIG. 11B, the processor 410 may display a second user interface 1102 in response to a first input via the first object 1115.

The second user interface 1102 may include the image 1110 depicting a watch face, an image 1120 of a first smart watch (e.g., of the bezel and other features outside the watch face) and an image 1125 of a first strap that match the image 1110 of the watch face. Further, the second user interface 1102 may display information 1128 on the first smart watch, information 1129 on the first strap, and a second object 1127 (e.g., selectable icons).

For example, the second object 1127 may be an object selectable to request the first user interface 1101. For example, when an input selecting the second object 1127 is detected, the processor 410 may display the first user interface 1101.

For example, when input is detected to the information 1128 on the first smart watch is detected, the processor 410 may display a smart watch different from the first smart watch 1120, such as one in a "classic" style. Also, when input relating to the information 1129 on the first strap is received, the processor 410 may display a strap different from the first strap 1125, such as one in a "dark grey" color.

Referring to FIG. 11C, the processor 410 may display a third user interface 1103 in response to the input relating to the information 1128 on the first smart watch and/or the information 1129 on the first strap.

The third user interface 1103 may include the image 1110 of the watch face, an image 1130 of a second smart watch (e.g., the bezel and other features outside of the watch face) and an image 1135 of a second strap that matches the image 1110 of the watch face. Further, the third user interface 1103 may display information 1138 on the second smart watch, information 1139 on the second strap, and a third object 1137 (e.g., these being selectable icons). For example, the third object 1137 may function the same as the second object 1127 of FIG. 11B.

The second smart watch 1130 may be a different type of smart watch from that of the first smart watch 1120. Also, the second strap 1135 may be a different type of strap from that of the first strap 1125.

For example, when input selecting the information 1138 on the second smart watch is detected, the processor 410 may display a smart watch different from the second smart watch 1130 in a "sports" style. Also, when input selecting the information 1139 on the second strap is detected, the processor 410 may display a strap different from the second strap 1135 in "black" color.

Figure 12A:
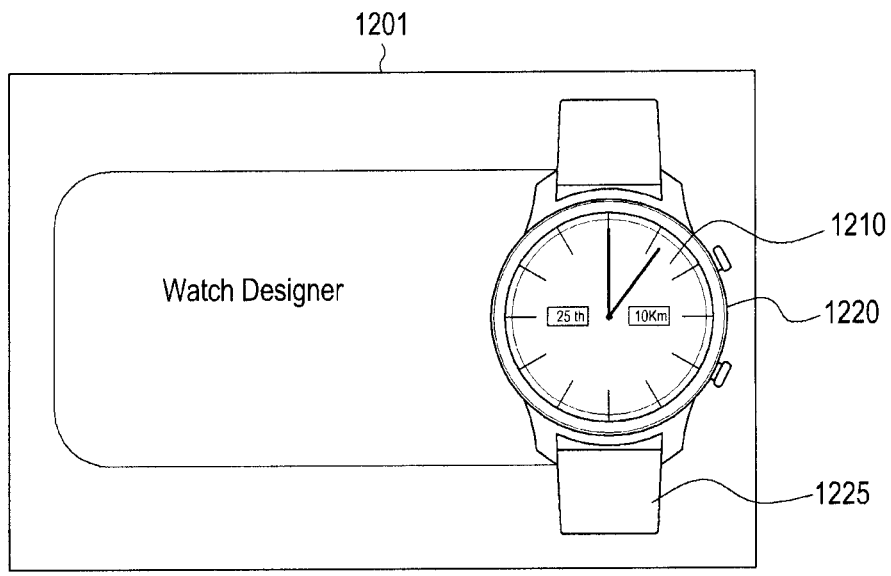
FIG. 12A and FIG. 12B illustrate user interfaces provided by an electronic device according to various example embodiments.
Figure 12B:
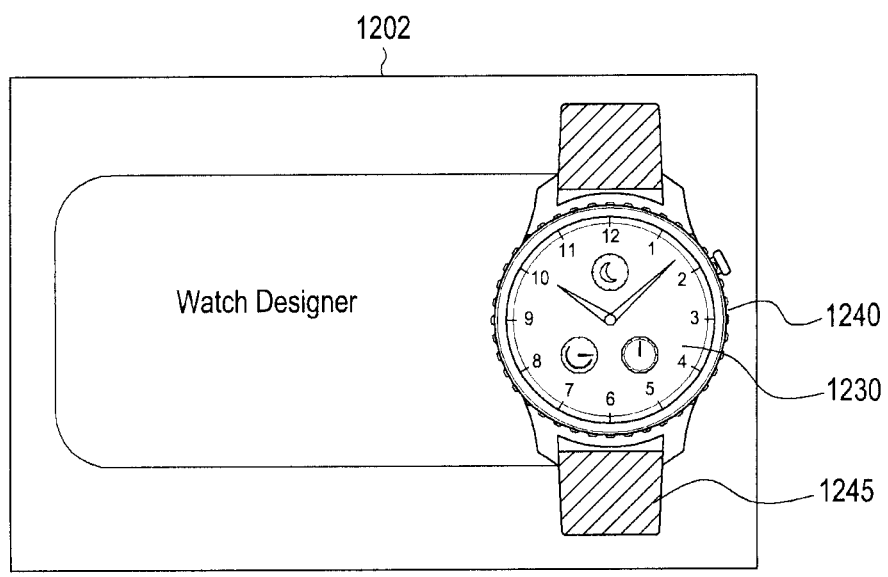

FIGS. 12A and 12B illustrate user interfaces provided by an electronic device according to various example embodiments.

Referring to FIGS. 12A and 12B, a processor 410 may provide information regarding a first smart watch 1220 and a first strap 1225 that match a first image 1210 of a watch face, in response to detecting a first event.

The processor 410 may provide information regarding a second smart watch 1240 and a second strap 1245 that match a second image 1230 of a watch face in response to detecting a second event. For example, the second smart watch 1240 may be the same as or different from the first smart watch 1220, and the second strap 1245 may be the same as or different from the first strap 1225. Also, the second image 1230 may be the same as or different from the first image 1210.

For example, the first event and the second event may include an operation of executing a designated program.

Referring to FIG. 12A, when first execution of the designated program is performed, the processor 410 may obtain the first image 1210 of the watch face, may analyze the first image 1210, and may determine the first smart watch 1240 and the second strap 1245 that match the first image 1210.

The processor 410 may display, on a display 430, an image 1201 including the first image 1210 of the watch face and images of the first smart watch 1220 and the first strap 1225.

Referring to FIG. 12B, when second execution of the designated program is performed, the processor 410 may obtain the second image 1230 of the watch face, may analyze the second image 1230, and may determine the second smart watch 1240 and the second strap 1245 that match the second image 1230.

The processor 410 may display, on the display 430, an image 1202 including the second image 1230 of the watch face and images of the second smart watch 1240 and the second strap 1245.

An electronic device according to various example embodiments may include: a display; a memory; and a processor configured to obtain an image of a watch face, to determine a first electronic device corresponding to the image among a plurality of electronic devices based on the image of the watch face, and to provide an image of the first electronic device in relation to the image of the watch face through the display.

The processor may be configured to determine the first electronic device among the plurality of electronic devices based on a form and a resolution of the image of the watch face.

The processor may be configured to determine the first electronic device among the plurality of electronic devices based on at least one of a size, a number, and a distribution of a plurality of objects included in the image of the watch face.

The processor may be configured to determine the first electronic device among the plurality of electronic devices based on a material of a background image included in the image of the watch face.

The processor may be configured to determine the first electronic device among the plurality of electronic devices based on a color of the image of the watch face.

The electronic device may further include a communication module, and the processor may be configured to determine the first electronic device among the plurality of electronic devices based on information on the image of the watch face obtained from an external electronic device through the communication module.

The processor may be configured to determine a first peripheral device among a plurality of peripheral devices relating to the first electronic device based on the image of the watch face and the first electronic device, and to provide an image of the peripheral device in relation to the image of the watch face.

The processor may be configured to determine a material and a color of the first peripheral device based on the image of the watch face and the first electronic device.

The processor may be configured to determine a second electronic device, which is different from the first electronic device, among the plurality of electronic devices based on the image of the watch face in response to an event, and to display an image of the second electronic device in relation to the image of the watch face.

The first electronic device may include a smart watch or an activity tracker.

An operation method of an electronic device according to various example embodiments may include: obtaining an image of a watch face; determining a first electronic device corresponding to the image among a plurality of electronic devices based on the image of the watch face; and displaying, on a display, an image of the first electronic device in relation to the image of the watch face.

The determining of the first electronic device may include determining the first electronic device among the plurality of electronic devices based on a form and a resolution of the image of the watch face.

The determining of the first electronic device may include determining the first electronic device among the plurality of electronic devices based on at least one of a size, a number, and a distribution of a plurality of objects included in the image of the watch face.

The determining of the first electronic device may include determining the first electronic device among the plurality of electronic devices based on a material of a background included in the image of the watch face.

The determining of the first electronic device may include determining the first electronic device among the plurality of electronic devices based on a color of the image of the watch face.

The determining of the first electronic device may include: obtaining information on the image from an external electronic device through a communication module of the electronic device; and determining the first electronic device among the plurality of electronic devices based on the obtained information on the image.

The operation method may further include: determining a first peripheral device among a plurality of peripheral devices corresponding to the watch face based on the image of the watch face and the first electronic device; and displaying an image of the first peripheral device in relation to the image of the watch face.

The determining of the first peripheral device may include determining a material and a color of the first peripheral device based on the image of the watch face and the first electronic device.

The operation method may further include: determining a second electronic device, which is different from the first electronic device, among the plurality of electronic devices based on the image of the watch face in response to an event; and displaying an image of the second electronic device in relation to the image of the watch face.

A computer-readable recording media according to various example embodiments may store a program to implement an operation method of an electronic device, the operation method including: obtaining an image of a watch face; determining a first electronic device corresponding to the image among a plurality of electronic devices based on a form of the image of the watch face and a plurality of objects included in the image; and displaying, on a display, an image of the determined first electronic device in relation to the image of the watch face.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments may be combined to form a single entity, and thus, may equivalently execute functions of the corresponding elements prior to the combination.

The embodiments disclosed herein are provided merely to easily describe technical details of the present disclosure and to help the understanding of the present disclosure, and are not intended to limit the present disclosure. Therefore, it should be construed that all modifications and changes or modified and changed forms based on the technical idea of the present disclosure fall within the present disclosure.

What is claimed is:

1. An electronic device comprising:
a display;
a memory; and
a processor operatively coupled to the memory,
wherein the processor is configured to:
obtain first image including a watch face,
select a first electronic device matching the watch face among a plurality of electronic devices by comparing one or more characteristics of the watch face in the first image to the plurality of electronic devices,
control the display to display a second image including the watch face and the selected first electronic device,
select a first peripheral device matching the second image among a plurality of peripheral devices based on the first image and the selected first electronic device, and
control the display to display a third image including the watch face, the selected first electronic device and the selected first peripheral device.

2. The electronic device of claim 1, wherein the one or more characteristics comprises a form of the watch face including a bezel as indicated by a resolution of the image.

3. The electronic device of claim 1, wherein the processor is configured to select the first electronic device from among the plurality of electronic devices based on at least one of a size, a number, or a distribution of a plurality of objects disposed on the watch face, and
wherein the plurality of objects include at least one or more of a bezel, a lug, a hand, a dial, a sub-dials, a textual marking or a numerical marking.

4. The electronic device of claim 1, wherein the one or more characteristics comprises a material forming a background of the watch face.

5. The electronic device of claim 1, wherein the one or more characteristics comprises a color of watch face.

6. The electronic device of claim 1, further comprising a communication module,
wherein the first image of the watch face is received from an external electronic device through the communication module.

7. The electronic device of claim 1, wherein the memory stores identification information for the plurality of electronic devices and identification information for the plurality of peripheral devices.

8. The electronic device of claim 1, wherein the processor is configured to determine a material and a color of the first peripheral device according to the image of the watch face and the selected first electronic device.

9. The electronic device of claim 1, wherein the processor is configured to:
in response to detecting a predetermined event, select a second electronic device different from the first electronic device from among the plurality of electronic devices based on the first image of the watch face, and
display an image of the selected second electronic device.

10. The electronic device of claim 1, wherein the first electronic device comprises a smart watch or an activity tracker.

11. An method of an electronic device, the method comprising:
- obtaining a first image including a watch face;
- selecting a first electronic device matching the watch face among a plurality of electronic devices stored in the electronic device by comparing one or more characteristics of the watch face in the first image to the plurality of electronic devices;
- displaying, on a display of the electronic device, a second image including the watch face and the selected first electronic device;
- selecting a first peripheral device matching the second image among a plurality of peripheral devices based on the first image and the selected first electronic device; and
- displaying, on the display, a third image including the watch face, the selected first electronic device and the selected first peripheral device.

12. The method of claim 11, wherein the one or more characteristics comprises a form of the watch face including a bezel as indicated by a resolution of the image.

13. The method of claim 11, further comprising:
- selecting the first electronic device from among the plurality of electronic devices based on at least one of a size, a number, or a distribution of a plurality of objects disposed on the watch face, and
- wherein the plurality of objects include at least one or more of a bezel, a lug, a hand, a dial, a sub-dials, a textual marking or a numerical marking.

14. The method of claim 11, wherein the one or more characteristics comprises a material forming a background of the watch face.

15. The method of claim 11, wherein the one or more characteristics comprises a color of watch face.

16. The method of claim 11, wherein the first image of the watch face is received from an external electronic device through a communication module of the electronic device.

17. The method of claim 11, further comprising identifying a material and a color of the first peripheral device according to the image of the watch face and the selected first electronic device.

18. The method of claim 11, further comprising:
- in response to detecting a predetermined event, selecting a second electronic device different from the first electronic device from among the plurality of electronic devices based on the first image of the watch face, and
- displaying an image of the selected second electronic device.

19. A non-transitory computer-readable recording media storing programming instructions which are executable by a processor to cause the processor to:
- obtain a first image including a watch face;
- select a first electronic device matching the watch face among a plurality of electronic devices stored in the electronic device by comparing one or more characteristics of the watch face in the first image to the plurality of electronic devices;
- display, on a display, a second image including the watch face and the selected first electronic device;
- select a first peripheral device matching the second image among a plurality of peripheral devices based on the first image and the selected first electronic device; and
- display, on the display, a third image including the watch face, the selected first electronic device and the selected first peripheral device.

* * * * *